United States Patent
Shin

(10) Patent No.: US 7,053,886 B2
(45) Date of Patent: May 30, 2006

(54) LIQUID CRYSTAL PANEL DEVICE HAVING A TOUCH PANEL AND METHOD FOR DRIVING THE SAME

(75) Inventor: Cheon Kee Shin, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 207 days.

(21) Appl. No.: 10/322,556

(22) Filed: Dec. 19, 2002

(65) Prior Publication Data

US 2003/0122798 A1 Jul. 3, 2003

(30) Foreign Application Priority Data

Dec. 27, 2001 (KR) ................ 2001-86114

(51) Int. Cl.
*G09G 5/00* (2006.01)
*G06K 11/06* (2006.01)
*G08C 21/00* (2006.01)

(52) U.S. Cl. ................ 345/173; 178/18.01; 178/18.02

(58) Field of Classification Search ................ 345/104, 345/173, 98; 178/18.01–18.09
See application file for complete search history.

(56) References Cited

U.S. PATENT DOCUMENTS 6,236,386 B1 * 5/2001 Watanabe ................ 345/98
6,624,835 B1 * 9/2003 Willig ................ 347/173

\* cited by examiner

*Primary Examiner*—Sumati Lefkowitz
*Assistant Examiner*—Rodney Amadiz
(74) *Attorney, Agent, or Firm*—McKenna Long & Aldridge LLP

(57) ABSTRACT

A liquid crystal panel device having a touch panel, includes a liquid crystal panel, a touch panel positioned on the liquid crystal panel, a signal line having one end connected to the liquid crystal panel, and a touch controller for receiving analog signals generated by contacting the touch panel to determine X/Y coordinates, wherein the touch controller detects rising and falling of a liquid crystal driving voltage transmitted from the signal line.

12 Claims, 4 Drawing Sheets

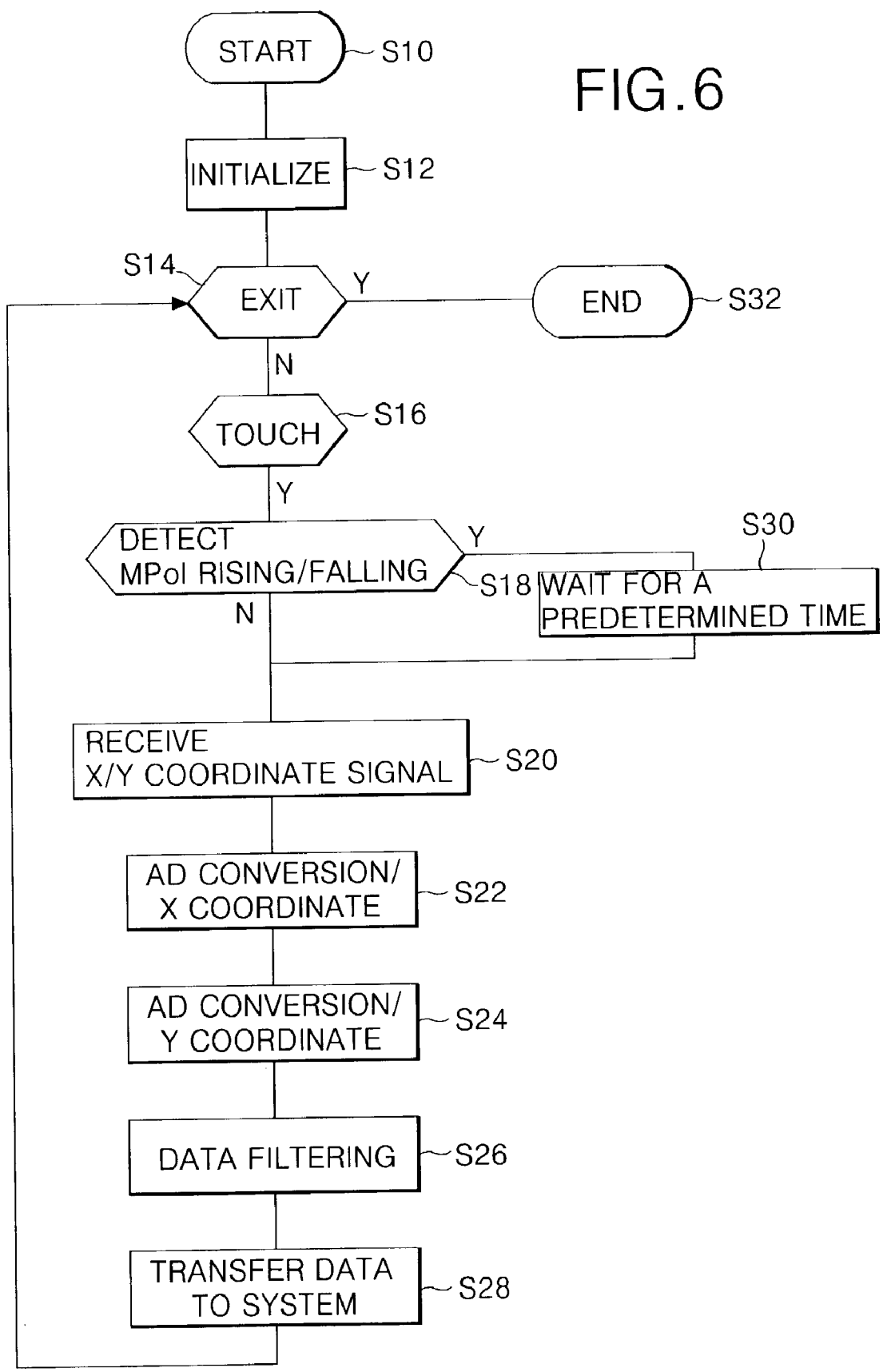

LIQUID CRYSTAL PANEL DEVICE HAVING A TOUCH PANEL AND METHOD FOR DRIVING THE SAME

The present invention claims the benefit of Korean Patent Application No. P2001-86114, filed in Korea on Dec. 27, 2001, which is hereby incorporated by reference.

BACKGROUND OF THE INVENTION

1. Field of the Invention

The present invention relates to a liquid crystal panel, and more particularly to a liquid crystal panel device having a touch panel and a method for driving the same.

2. Discussion of the Related Art

A touch panel is a peripheral device of a computer, and can be loaded (or installed) on the display surface of a display device such as a cathode ray tube (CRT), a liquid crystal display (LCD), a field emission display (FED), a plasma display panel (PDP), an electric luminescence device (ELD). The touch panel allows a user to press the panel and provide input to the computer while watching the display surface of the display device.

FIG. 1 is a schematic view of a liquid crystal panel having a touch panel according to related art. The liquid crystal panel having a touch panel has a stacked layer structure. The liquid crystal panel 10 is located between an upper polarizing sheet 24 and a lower polarizing sheet 26, and the touch panel 12 is located on the upper polarizing sheet 24. According to the related art, the liquid crystal panel 10 includes an upper substrate, a lower substrate, and a liquid crystal material injected between the substrates and ball spacers for maintaining a space between the upper and lower substrates. The ball spacers also allow the liquid crystal material to have a uniform thickness.

The touch panel 12 includes an upper substrate 14 such as a polyethylene terephthalate (PET) film, a lower substrate 16, and spacers 22 distributed between the substrates. A first conductive layer 18 is formed on an under surface of the upper substrate 14, and a second conductive layer 20 is formed on an upper surface of the lower substrate 16. When the upper substrate 14 is pressed by a stylus pen or fingers, the first conductive layer 18 forms a short-circuit with the second conductive layer 20, thereby enabling generation of an electrical current or voltage level varying signal. The first and second conductive layers 18 and 20 are formed by printing silver Ag on a transparent conductive material such as Indium-Tin-Oxide (ITO), Indium-Zinc-Oxide (IZO) and Indium-Tin-Zinc-Oxide (ITZO).

This type of liquid crystal panel having a touch panel drives the liquid crystal in one of a dot inversion system, a column inversion system, and a line inversion system. Among these systems, the line inversion driving system is commonly used in small portable FDP's because of the reduced power consumption.

In the line inversion driving system, image data is applied to each line having alternating polarities of plus (+) and minus (−) opposite to a common voltage on a common electrode, thereby preventing the liquid crystal material from degradation.

FIG. 2 is a diagram of a driving apparatus for the liquid crystal panel having a touch panel as shown in FIG. 1 according to related art. In FIG. 2, the liquid crystal panel having a touch panel includes a liquid crystal panel 10, a touch panel 12, an analog-digital converter (ADC) 28 for converting a signal from the touch panel 12 into a digital signal, a central processing unit (CPU) 30 for producing signals of X/Y coordinates based on the digital signal, a transmission line 32 for transmitting the signals of the X/Y coordinates, and an application system 34 enabling a displaying content to be displayed on the liquid crystal panel based on the signals of the X/Y coordinates received from the transmission line 32. The ADC 28 and the CPU 30 form a touch controller. When a user touches the touch panel 12, the first conductive layer 18 and the second conductive layer 20 create a short-circuit such that an analog signal is generated having an electric current or voltage level. Subsequently, the analog signals X+, X−, Y+, and Y−, which were generated by the touch panel 12, each have the electric current or voltage level and are converted into the digital signals by the ADC 28.

Thereafter, the converted digital signals X+, X−, Y+, and Y− from the ADC 28 are input to the CPU 30 in a serial or parallel format. Then, the CPU 30 produces X and Y coordinates based on the converted digital signals X+, X−, Y+, and Y−. The signals of the X and Y coordinates generated from the CPU 30 are transmitted to the application system 34 through the transmission line 32. The transmission line 32 uses USB or PS/2 by applying a transmission protocol, such as RS 232. Finally, the application system 34 transmits a display controlling signal corresponding to the received X and Y coordinate signals to the liquid crystal module, thereby allowing a corresponding image to be displayed. In such a line inversion driving system, switching noise of a common voltage Vcom influences an arbitrary voltage value of the X/Y coordinate such that the output of the voltage value of the X/Y coordinate is unstable. Accordingly, an exact detection of the X/Y coordinates is impossible.

FIG. 3 is a waveform diagram of a liquid crystal driving voltage and a X/Y voltage signal of the touch panel of the liquid crystal panel shown in FIG. 1 according to the related art.

In FIG. 3, the voltages of X and Y include noises generated during a constant time interval due to rising and falling of the common voltage Vcom (i.e., a polarity reversal of the common voltage Vcom). Accordingly, when a user touches the touch panel using a stylus pen or a finger, a broad or trembling darkness problem occurs at the surroundings of the touched position because of noise. Thus, accurate detection of the coordinates is impossible.

SUMMARY OF THE INVENTION

Accordingly, it is an object of the present invention to provide a liquid crystal panel device having a touch panel capable of accurately detecting a coordinate voltage value regardless of switching noise, and a driving method thereof.

In order to achieve these and other advantages, and in accordance with the purpose of the present invention, as embodied and broadly described a liquid crystal panel device including a touch panel, comprises a liquid crystal panel, a touch panel positioned on the liquid crystal panel, a signal line having one end connected to the liquid crystal panel, and a touch controller for receiving analog signals generated by contacting the touch panel to determine X/Y coordinates, wherein the touch controller detects rising and falling of a liquid crystal driving voltage transmitted from the signal line.

In another aspect, a liquid crystal panel device having a touch panel, includes a liquid crystal panel, a touch panel positioned on the liquid crystal panel, an analog-to-digital converter for converting signals from the touch panel into digital signals, a CPU generating a X/Y coordinate signals based on the digital signals, a communication line for transmitting the X/Y coordinates signals, an application system for displaying position data on the liquid crystal panel based on transmitted X/Y coordinate signals, and a signal line for applying a drive signal for driving the liquid crystal panel.

In another aspect, a method for driving a liquid crystal panel device having a touch panel, includes the steps of inputting a liquid crystal driving voltage to a touch controller, detecting rising and falling of the liquid crystal driving voltage by the touch controller, receiving analog signals generated by contacting a touch panel after a first predetermined period during detection of the rising and falling of the liquid crystal driving voltage are detected by the touch controller, converting the received analog signals into digital signals by the touch controller, and outputting X and Y coordinates corresponding to contact position on the touch panel based on the digital signals by the touch controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a flowchart showing exemplary steps for coordinate recognition according to the present invention.

DETAILED DESCRIPTION OF THE PREFERRED EMBODIMENTS

Reference will not be made in detail to the preferred embodiments of the present invention, examples of which are illustrated in the accompanying drawings.

Figure 1:
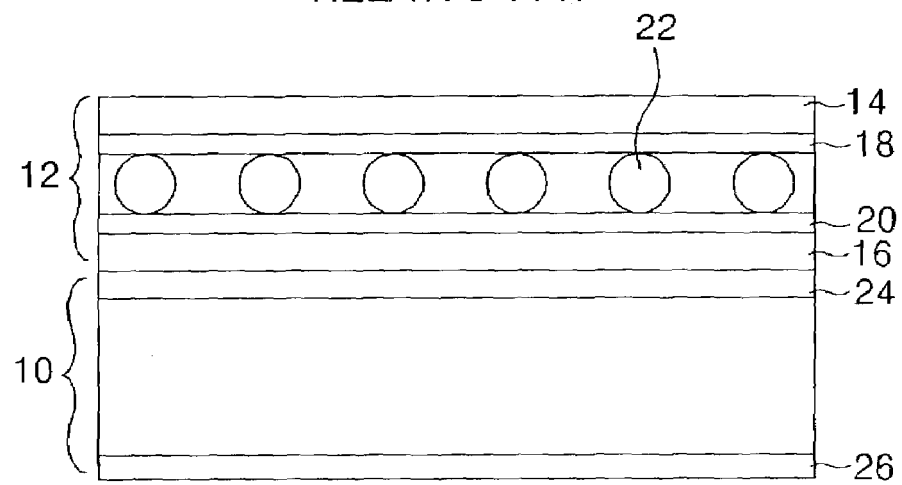
FIG. 1 is a schematic view of a the liquid crystal panel having a touch panel according to related art.
Figure 2:
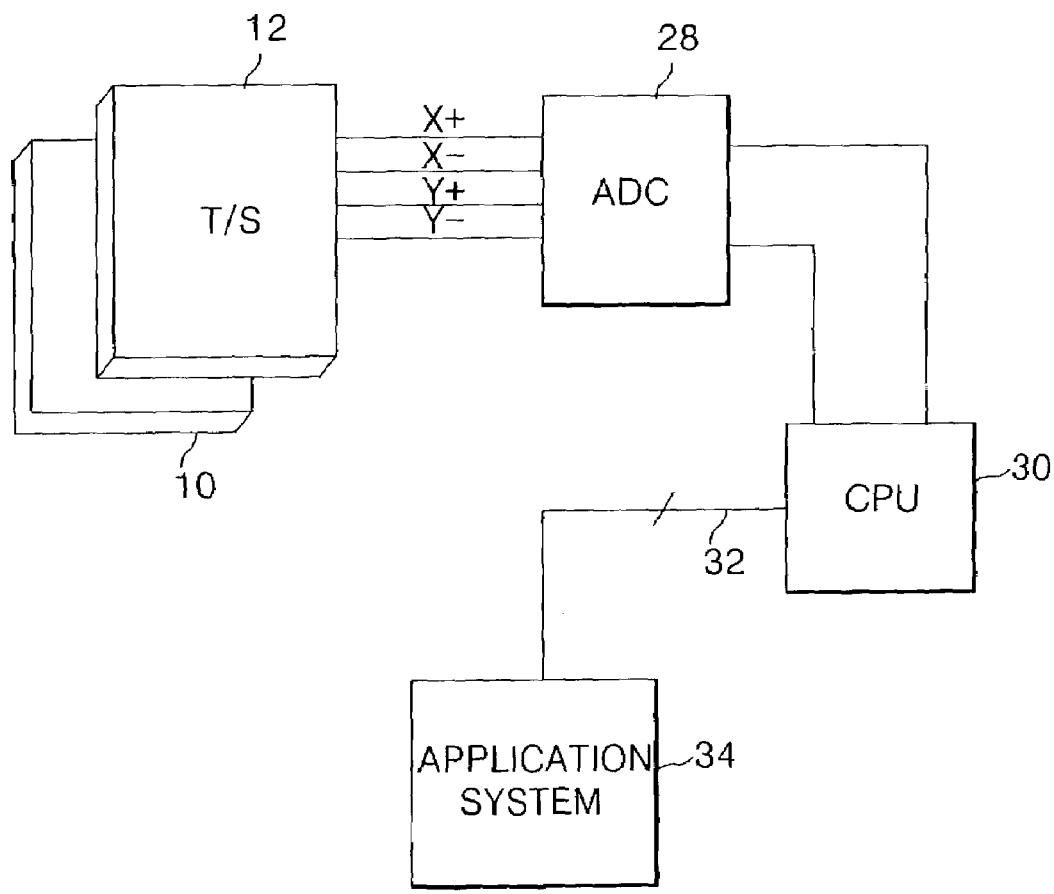
FIG. 2 is a diagram including a driving apparatus of the liquid crystal panel having a touch panel shown in FIG. 1 according to related art.
Figure 3:
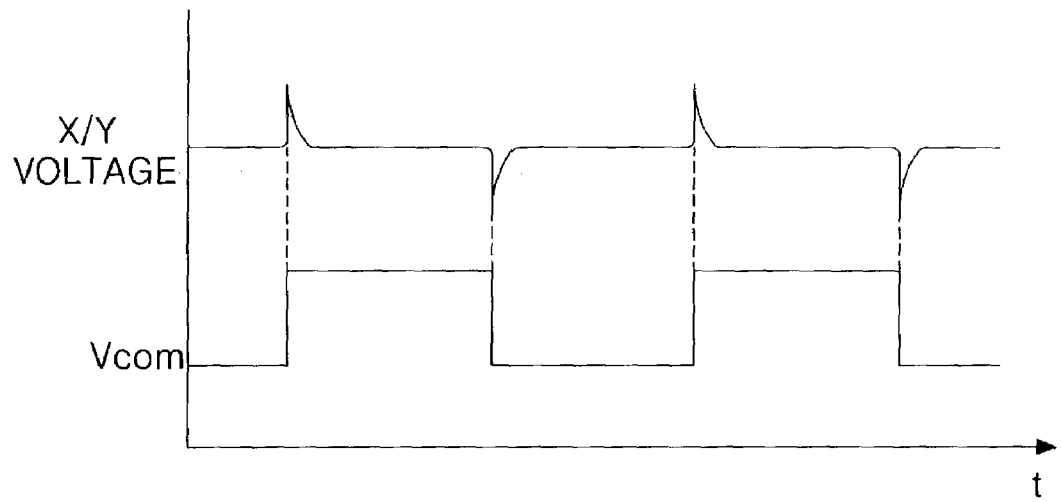
FIG. 3 is a waveform diagram of a liquid crystal driving voltage and a X/Y voltage signal of the touch panel shown in FIG. 1 according to related art.
Figure 4:
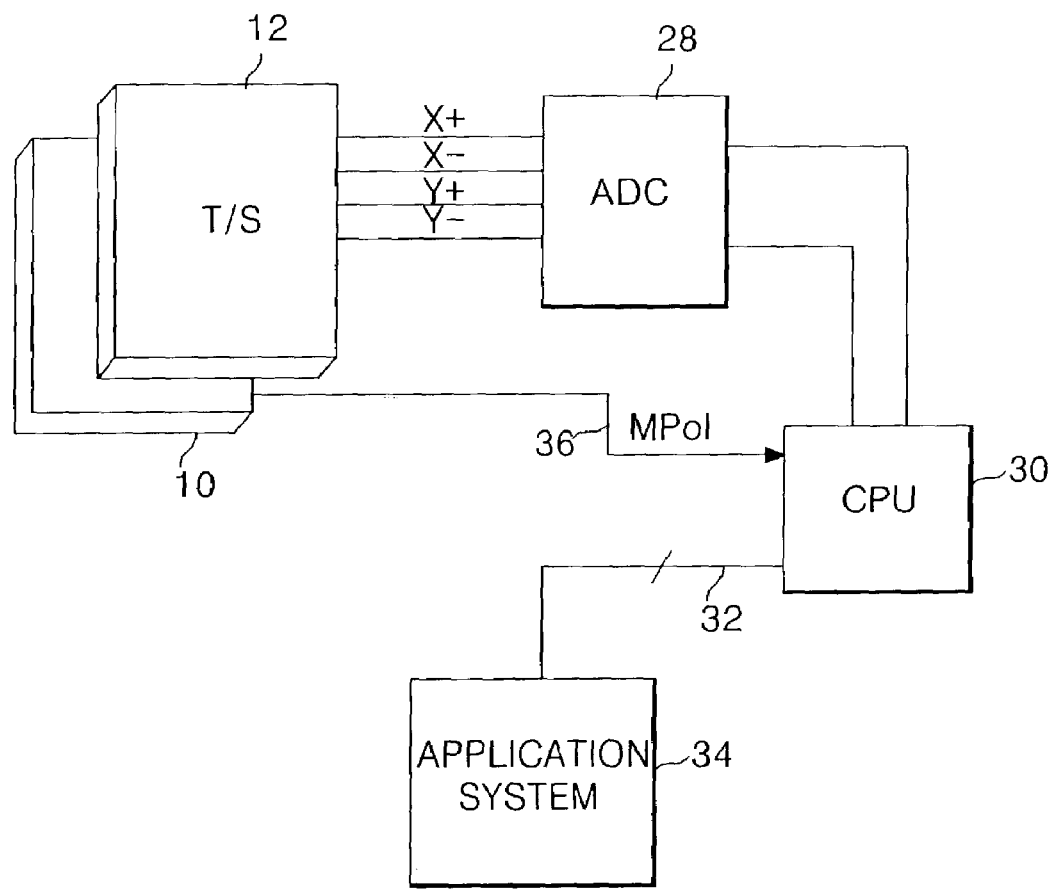
FIG. 4 is a diagram including an exemplary driving apparatus of a liquid crystal panel device having a touch panel according to the present invention.

FIG. 4 is a diagram including an exemplary driving apparatus of a liquid crystal panel device having a touch panel according to the present invention. In FIG. 4, the liquid crystal panel device may include a liquid crystal panel 10, a touch panel 12, an analog-digital converter (ADC) 28 for converting signals output from the touch panel 12 into digital signals, a CPU 30 for generating a X/Y coordinate signal based on the digital signals, a communication line 32 for transmitting the X/Y coordinate signals, an application system 34 for displaying a display content on the liquid crystal panel 10 based on the received X/Y coordinate signals, and a signal line 36 for applying a common voltage signal Mpol driving the liquid crystal panel 10 to the CPU 30, wherein the analog-digital converter 28 and the CPU 30 form a touch controller.

An exemplary operation of the liquid crystal panel device having a touch panel according to the present invention will now be described. When the touch panel 12 is touched by a user, the common voltage signal Mpol may be input from the touch panel 12 to the CPU 30 through the signal line 36. The CPU 30 may detect any rising and/or falling edges of the common voltage signal Mpol (i.e., a polarity reversal time of the Vcom signal Mpol). If any of the rising and/or falling edges of the common voltage signal Mpol is detected, the ADC 28 may be instructed by the CPU 30 not to receive the analog signals generated in the touch panel during a predetermined (or constant) period from the rising or falling edge of the common voltage signal Mpol. Accordingly, the CPU may force the ADC 28 to enter into an idle state (a standby mode) for the predetermined period from the rising or falling edge of the common voltage signal Mpol.

After the predetermined period from the rising or falling edge of the common voltage signal Mpol, the analog signals X+, X−, Y+, and Y−, each having an electric current or voltage level generated in the touch panel 12, may be input to the analog-digital converter 28. The analog-digital converter 28 may convert the analog signals X+, X−, Y+, and Y− from the touch panel 12 into digital signals. Thereafter, the analog-digital converter 28 may extract stable components from the analog signals X+, X−, Y+, and Y− controlled by the CPU 30 in response to the rising and falling edges of the common voltage signal Mpol. Accordingly, the analog-digital converter 28 may enter an idle state (or the standby mode) by not receiving analog signals X+, X−, Y+and Y− for the predetermined period from the rising or falling edge of the common voltage signal Mpol until the analog signal X+, X−, Y+ and Y− become stable. Thus, preventing receipt of unstable components among the entire components of the analog signals X+, X−, Y+, and Y−.

The converted digital signals X+, X−, Y+, and Y− output from the analog-digital converter 28 may be input to the CPU 30 in one of a serial or parallel format. The CPU 30 may operate X and Y coordinates based on the converted digital signals X+, X−, Y+, and Y−. Accordingly, accuracy of the operated X/Y coordinates may be increased sine the unstable signal components in the receiving of the analog signals X+, X−, Y+, and Y− have been eliminated. Then, the X and Y coordinate signals from the CPU 30 may be transmitted to the application system 34 through the communication line 32. The communication line 32 may employ a USB, a PS/2, or an interface element, such as an RS232 communication protocol.

Next, the application system 34 may transmit a display controlling signal to the liquid crystal module according to the X and Y coordinate signals output from the CPU 30, thereby allowing a corresponding display image to be displayed on the liquid crystal module. Accordingly, elimination of unstable components generated in the X/Y analog signals during reversal of the common voltage signal Mpol enables accurate detection of the X/Y coordinates.

Figure 5:
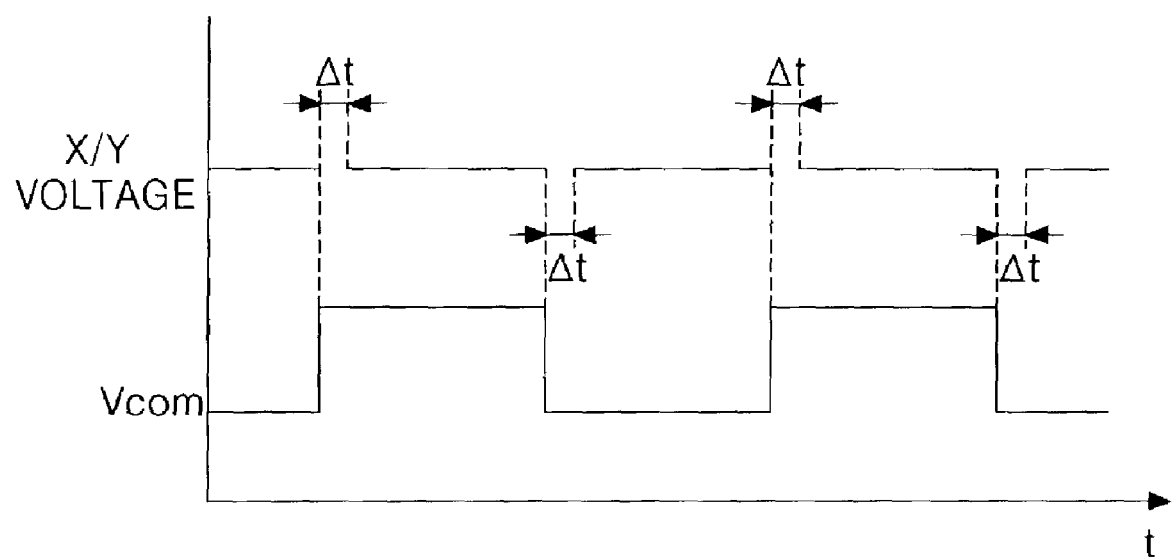
FIG. 5 is an exemplary waveform diagram of a liquid crystal driving voltage and a X/Y voltage signal of a touch panel according to the present invention.

FIG. 5 is an exemplary waveform diagram of a liquid crystal driving voltage and a X/Y voltage signal of a touch panel according to the present invention.

In FIG. 5, the X/Y voltage signal may be sampled by the analog-digital converter after a constant period )t from a rising edge and a falling edge of the common voltage signal Mpol. Accordingly, the X/Y signal may be sampled by the analog-digital converter to include only stable portions of the signal. In addition, the X/Y voltage signal sampled after the constant period from the rising or falling edges of the common voltage signal Mpol may have a constant value.

FIG. 6 is a flowchart showing exemplary steps for coordinate recognition according to the present invention. As shown in FIG. 6, a system or apparatus is reset or initialized (a resetting of the CPU 30) during a step S12. Thereafter, during a step S16, a touch panel may be touched by a user. During a step S18, rising/falling edges of a liquid crystal driving voltage (Mpol signal) to be input to the touch controller may be detected.

During a step S20, if the rising/falling edges of the liquid crystal driving voltage Mpol are not detected during the step S18, the X/Y voltage signals are received. Conversely, if rising/falling edges of the liquid crystal driving voltage Mpol are detected, a standby mode is initiated for a constant period during step S30. During step S22, the signal from the touch panel may be converted into a digital signal by selecting a X coordinate based on the digital signal. During a step S24, a Y coordinate may be selected based on the digital signal. During a step S26, the obtained X/Y coordinate signal may be filtered, and during a step S28, the signal may be transmitted to the system. After the touch signal has been processed during step S28, the system returns to the step S14 to process another touch signal. However, if the end button is selected at this time, the coordinate recognition processing ends as shown in the step S32.

The present invention enables an X/Y analog signal to be placed in a standby mode for a predetermined period of a rising/falling edge of a common voltage signal Mpol, thereby allowing extraction of stable components of the X/Y voltage signal.

In addition, the liquid crystal panel having a touch panel according to the present invention extracts only stable signal components after a predetermined period (or a constant period) from the rising/falling edge of the common voltage signal, thereby obtaining the coordinates on the basis of the extracted signals. Accordingly, the present invention prevents the detection of inaccurate X/Y coordinates generated by unstable components of the X/Y voltage signals.

It will be apparent to those skilled in the art that various modifications and variations can be made in the liquid crystal panel having a touch panel and the method for driving the same of the present invention without departing from the spirit or scope of the invention. Thus, it is intended that the present invention cover the modifications and variations of this invention provided they come within the scope of the appended claims and their equivalents.

What is claimed is:

1. A liquid crystal panel device including a touch panel, comprising:
    a liquid crystal panel;
    a touch panel positioned on the liquid crystal panel;
    a signal line having one end connected to the liquid crystal panel; and
    a touch controller for receiving analog signals generated by contacting the touch panel to determine X/Y coordinates,
    wherein the touch controller detects one of a rising edge and a falling edge of a liquid crystal common voltage transmitted through the signal line and wherein when the one of the rising edge and the falling edge of the liquid crystal common voltage transmitted through the signal line is detected, the touch controller enters a stand by mode for a predetermined period.

2. The device according to claim 1, wherein the touch controller includes an analog-to-digital converter for converting the analog signals generated by the contact of the touch panel into digital signals, and a CPU for operating the X and Y coordinates corresponding to a contacted position based on the converted analog signals.

3. The device according to claim 1, wherein the touch controller extracts only stable components of the analog signals.

4. The device according to claim 1, further comprising a system for receiving the X and Y coordinate signals from the touch controller for displaying position data corresponding to a contacted position on the liquid crystal panel.

5. The device according to claim 4, wherein the system is an application system.

6. A liquid crystal panel device having a touch panel, comprising:
    a liquid crystal panel;
    a touch panel positioned on the liquid crystal panel;
    an analog-to-digital converter for converting signals from the touch panel into digital signals;
    a CPU for generating a X/Y coordinate signals based on the digital signals;
    a communication line for transmitting the X/Y coordinates signals;
    an application system for displaying position data on the liquid crystal panel based on transmitted X/Y coordinate signals; and
    a signal line for transmitting a common voltage signal from the liquid crystal panel to the CPU, wherein the CPU detects one of a rising edge and a falling edge of the common voltage signal and places the analog to digital converter into a stand by mode.

7. The device according to claim 6, wherein the analog-digital converter extracts only stable components of the analog signals.

8. A method for driving a liquid crystal panel device having a touch panel, comprising:
    inputting a liquid crystal common voltage to a touch controller;
    detecting one of a rising edge and a falling edge of the liquid crystal common voltage by the touch controller;
    when the one of the rising edge and the falling edge of the liquid crystal common voltage is detected, entering the touch controller in a stand by mode for a first predetermined period and receiving analog signals generated by contacting a touch panel after the first predetermined period;
    converting the received analog signals into digital signals by the touch controller; and
    outputting X and Y coordinates corresponding to contact position on the touch panel based on the digital signals by the touch controller.

9. The method according to claim 8, further comprising receiving the analog signals generated by the contacting of the touch panel after the stand by mode for a second predetermined period from the polarity reversal of a liquid crystal driving voltage to prevent receipt of unstable component signals among the signals generated by the contacting of the touch panel.

10. The device according to claim 1, wherein the touch controller does not receive the analog signals generated by contacting the touch panel at the stand by mode.

11. The device according to claim 6, wherein the analog-to-digital converter does not convert the signals from the touch panel at the stand by mode.

12. The method according to claim 8, wherein the touch controller does not receive the analog signals generated by contacting the touch panel at the stand by mode.

* * * * *